UNITED STATES PATENT OFFICE 2,391,750

BITUMINOUS COMPOSITION

Purdum M. Snyder, Ben Avon, Pa., assignor to H. H. Robertson Company, Pittsburgh, Pa., a corporation of Pennsylvania No Drawing. Original application August 23, 1941, Serial No. 408,133. Divided and this application October 20, 1942, Serial No. 462,747

2 Claims. (Cl. 106—15)

This invention relates to a bituminous composition possessing flame retarding properties.

In general the object of the invention is to produce a flame retarding bituminous composition possessing the general physical and chemical characteristics of the bituminous component or components thereof, and which may be used with advantage for a wide variety of industrial uses, such for example, as an impregnant and as a coating material for rubber covered insulated wire, in the production of felted roofing materials, and those protected metal articles wherein bituminous materials are used as protected coatings, for tubular woven conduits, and in the production of other articles where bituminous materials are used. The flame retarding characteristics and properties of the present bituminous composition contribute greatly to the utility thereof and render the articles embodying the novel bituminous composition capable of more efficient and extended use.

With this general object in view and such others as may hereinafter appear, the invention consists in the flame retarding bituminous compositions hereinafter described and particularly defined in the claims at the end of this specification.

Prior to the present invention, high-grade stearine pitches were the only group of bituminous materials known to possess flame retarding properties to a degree sufficient to have any real commercial significance. The term "flame retarding" has become recognized to mean the ability to prevent spreading and propagation of a flame. Thus when a bituminous composition containing a substantial proportion of a stearine pitch is subjected to the direct action of a flame, the stearine pitch as it burns forms a carbonaceous ash film on the surface of the unburned portion thereof and this operates as an air seal preventing the rapid propagation of the flame, and in many instances actually terminating the combustion. For some purposes this characteristic property of stearine pitches has been utilized in the production of various commercial products, and typical uses have been the production of bituminous compositions having flame retarding properties for use as a saturant and finisher for tubular woven conduits, for the coating of roofing felts, and as a saturant and finisher for rubber covered insulated wire. The fire retarding properties of stearine pitches are attributed to the fact that, when heated to combustion temperatures, an ash structure or crust is formed which tends to confine the progress of a flame, and this effect may be regarded as the production of an air seal to insulate the underlying surface and thwart the further propagation of a flame.

Stearine pitch is a by-product of the fatty acid industry and the available supply thereof is accordingly limited. In addition, because of the varying materials from which and the conditions under which commercial forms of stearine pitches are produced, it has been exceedingly difficult to obtain on the market stearine pitches possessing uniform performance characteristics with respect to the flame retarding property. It has also been found exceedingly difficult to manufacture uniform stearine pitch compounds from a physical characteristic standpoint. such as softening point, viscosity and hardness. These variations in physical characteristics have a direct bearing on the utility of such compounds in their use in the production of rubber covered insulated wire, tubular woven conduits, and other articles of commercial significance.

The bituminous materials which may be used in the production of the present bituminous composition include those natural asphalts, gilsonite, steam reduced and air-blown asphalts from petroleum residua, coal tar pitches and stearine pitches and mixtures thereof which are characterized by their non-greasy and non-oily appearance and feel. The bituminous base to be used in making these bituminous flame retarding compositions has a melting point of at least 80° F. and is substantially solid and non-pourable at room temperatures. In this connection it is recognized that certain of these materials may exhibit the ability to cold flow at room temperature but are not pourable. For efficient flame retardance. it has been found that the bituminous base should be composed of at least 65% bituminous of the character above described. The bituminous materials which may be used also include the foregoing bituminous compositions having incorporated therein waxes, resins, or mixtures thereof. in proportions not to exceed 35% of the entire base and which are incorporated for compounding technique to impart desired properties to the composition. It has been found that a satisfactory degree of flame retardance cannot be imparted to the compositions by means of the metallic soaps in the proportions hereinafter set forth, when more than 35% of these waxes, resins or mixtures thereof, are incorporated in the bituminous material. The metallic soaps which may be employed are those which are substantially insoluble in water and include the metals which form such soaps when combined with the fatty acids and napthenic acids, including manganese, iron, zinc, chromium, cobalt, aluminum, magnesium and barium. I have found that metallic soaps of the metals iron, zinc, aluminum and barium either alone or in combination comprise the most economical and commercially practicable soaps to be used.

The present invention contemplates a bituminous composition possessing to a high degree the ability to retard flame when exposed to a direct flame, and in addition, retains the general physical characteristics of the bituminous component or components thereof. In addition, the present bituminous composition is such as to possess the ability to maintain predetermined physical characteristics such as softening point, hardness, viscosity, and tackiness, as well as weather resistance upon cooling to room temperature after having been heated to elevated temperatures. The ability of the present bituminous composition to maintain its physical characteristics in this manner renders it suitable for use as an impregnating and coating composition while permitting the desired control of the ultimate characteristics of the bituminous composition in the finished article, for example, in the production of rubber covered insulated code wire, it is preferred that the bituminous composition used as an impregnant or saturant for the cotton braid in the wire should possess characteristics as to hardness of from 15 to 30 when measured according to standard tests utilizing 100 grams for five seconds. At the same time, the fact that commercial production necessitates a speed of from 100 to 400 feet per minute of the wire as it is being passed through the impregnating bath makes it desirable that the heating of the bath to a temperature of approximately 350° F. in order to effect complete saturation with the period of time that the wire remains in the saturating bath. After the wire emerges from the bath, it is reeled up into coils and from a consideration of the varying temperature conditions to which the bituminous saturant is subjected, it will be recognized that any bituminous composition which is capable of use as a satisfactory impregnant for the cotton braid of rubber covered insulated wire must possess the ability to maintain its physical characteristics when cooled after having been heated to a substantial elevated temperature. In the application of the finishing coat of bituminous material to the saturated braid of the rubber covered insulated wire, similar conditions exist in which the maintenance of the physical characteristics as to hardness of the finishing coat should be maintained within the limits of from 3 to 18 as measured by the standard test using 100 grams for five seconds. If the bituminous material is too hard, then it tends to flake off and if it is too soft the wire soon gets out of shape in the coil, and other difficulties are experienced.

In the production of other articles and commercial products embodying bituminous compositions which it is desired should possess flame retarding properties, it is necessary that the physical characteristics be capable of control within rather definite limits and among such instances may be mentioned the production of roofing felts in which after the application of the finishing coat of bituminous material, the felt is rolled into roll form for commercial distribution and sale. It is extremely important that the finishing coat as well as the impregnant maintain its predetermined characteristics as to flexibility and hardness or otherwise cracking of the material will follow and durability of the felt as a roofing and protective layer will be diminished.

In producing the present bituminous composition possessing the desired flame retarding properties, a bituminous base is utilized and a definite proportion of a metallic soap is incorporated therein. The bituminous base may comprise any of the natural asphalts, gilsonite, steam reduced and air blown asphalts from petroleum residues, coal tar pitches and stearine pitches, and mixtures thereof. The metallic soap may comprise a soap selected from the soaps from the group of metals consisting of manganese, iron, zinc, chromium, cobalt, aluminum, magnesium, lead and barium, but best results have been secured utilizing a soap selected from the soaps from the group of metals consisting of iron, zinc, aluminum and barium. One or more soaps may be utilized in an amount within the range of from 3 to 15% by weight of the bituminous composition and preferably from 6 to 15% of such soaps.

The incorporation of these metallic soaps is preferably accomplished by mixing the previously prepared soaps, substantially free from moisture, with the bituminous composition at an elevated temperature, preferably above 150° F. or at such a temperature at which the bituminous base becomes sufficiently fluid to render the dispersion of the soap therein a simple mixing procedure. In some instances, incorporation of the soap may be caused to take place directly in the bituminous composition, such for example as by incorporating zinc oxide in a bituminous composition having blended in it a fatty acid and heating the mixture until saponification has been completed and the moisture resulting from the reaction has been dissipated. The quantity of zinc oxide added should be the amount required to satisfy the acid content and in such quantity that the total soap formed is within the prescribed limits of from 3 to 15%.

While manganese soaps impart most effective flame retardance to the bituminous compositions, nevertheless, because of the fact that manganese appears to be such an active catalyst, it is preferred for many purposes to utilize a soap or mixtures of soaps selected from the group comprising the soaps of iron, zinc, aluminum and barium, as such soaps appear to produce compounds efficient in flame retardance and at the same time of relatively permanent physical characteristics.

The present bituminous compositions possess effective flame retardance particularly useful in the production of rubber insulated cotton covered wire commonly known as code wire. Rubber insulated cotton covered wire having fire resistance and moisture proof properties is so made by first saturating the cotton braid with a stearine pitch-bearing composition, and then coating this saturated wire with a stearine pitch-bearing compound. In addition to making such wire fire resisting and moisture resisting, these stearine pitch-bearing compounds must have such physical properties so as to impart to the finished wire the ability to comply with other performance requirements such as flexibility, temperature stability and a low coefficient of friction. Typical examples of these performance requirements follow in a description of a flame test and a moisture absorption test.

*Flame test*

Support an 18″ sample vertically and rigidly in a room from which all drafts are excluded. A flame indictator of gummed kraft paper, ½" wide and 5 mils thick, shall be wrapped once around the sample with its lower edge 10" above the point at which the flame is applied. The ends of the indicator shall be pasted evenly together and shall project ¾" on the side of the wire opposite to that on which the flame is applied.

Apply the 1½" blue cone of a 5" flame (from a ¼" Bunsen burner having ¼" inlet and ⅜" to ½" mouth) at an angle of 20°, approximately 3" from the bottom of the sample, for 15 seconds, then remove for 15 seconds. This process is repeated four times, after which the sample shall not continue to burn for more than one minute and the paper indicator shall not be burned more than 25% of its area.

*Moisture absorption test*

A sample shall be bent around a mandrel, the diameter of which shall be determined from the overall diameter of the wire as follows:

| Size of conductor | Diameter of mandrel | Degrees bend |
|---|---|---|
| 14 to 12 A. W. G | 1 times diameter of wire | 360+ |
| 10 to 8 A. W. G | 1½ times diameter of wire | 360+ |
| 6 to 2 A. W. G | 2 times diameter of wire | 360+ |
| 1 to 4/0 A. W. G | 3 times diameter of wire | 180 |
| 250,000 to 500,000 CM | 4 times diameter of wire | 180 |
| 550,000 to 1,000,000 CM | 6 times diameter of wire | 180 |
| 1,100,000 to 2,000,000 CM | 7 times diameter of wire | 180 |

The sample shall be immersed in distilled water at room temperature for 72 hours after which the braids shall not have absorbed more than 15% of their weight.

Stearine pitch is a by-product of the fatty acid industry and is accordingly limited in supply. In addition, because of the varying materials and conditions under which commercial forms of stearine pitches are produced, it has been increasingly difficult to obtain such pitches possessing uniform performance from a flame-retarding standpoint. It has also been found exceedingly difficult to manufacture uniform stearine pitch-bearing compounds from a physical characteristic standpoint, such as softening point, viscosity and hardness, which have a direct effect on the performance properties of such articles as rubber insulated wire, tubular woven conduits and other articles of commercial significance.

The barium soaps have been found to be particularly effective from a flame retarding standpoint. However, the barium soaps are not readily dispersed in asphalts by simple mixing and fluxing together. In an effort to find a method whereby this could be accomplished, it was found that the barium soaps could first be mixed with other soaps which were readily dispersed by simple mixing and fluxing, and then in such combination could readily be dispersed in asphalts.

It was found that 50 parts of a barium soap and 50 parts of a zinc soap when mixed together, and then added to an asphalt or a bituminous combination, that fire retarding properties approximating the effectiveness of a manganese soap could be obtained, when added in approximately the same proportions. Percentages required to produce materials of commercial value fall within the range of 4 to 12%. In practice we have found that 6 to 12% is adequate.

Rubber insulated cotton covered wire treated with bituminous materials containing this combination after 6 months exposure have not exhibited the tendency to deteriorate. The degree of deterioration appears to be of about the same magnitude as would be obtained with straight asphaltic materials.

For example, I have found that when 6% of a mixture of 50% barium laurate and 50% zinc laurate is added to an asphalt having a melting point of 140° F., ball and ring, and a penetration of 21 at 77° F., 100 grams for 5 seconds, that the resulting composition has a melting point of 140° F., and a penetration of 20 at 77° F. Viscosity at 300° F. remains the same after the soap addition. These same physical properties can be readily reproduced from batch to batch. Further the flame retarding properties of such a combination are consistent from batch to batch. For example, I have found that when rubber insulated cotton covered wire is impregnated with this material and an excess is allowed to remain on the wire, and subjected to a 5 inch Bunsen burner flame while suspended in a vertical position, that sufficient encrusting occurs to thwart the propagation of a flame upward. A material having a melting point of 140° F., and a penetration of 20 at 77° F., is however, in itself unsuitable for the production of commercial wire, because of its tackiness and low flow point. In other words, wire finished with such a material would stick together in coils. Therefore, in practice, a material of this nature would be used solely as a saturant for the cotton braid, wiped reasonably dry, and subsequently finished with a harder, higher melting point material to render the wire suitable for handling.

I have found that when a bituminous composition composed of asphalt alone or complex bituminous mixtures such as a blend of asphalts, gilsonite, and wax, having melting points varying in range from 200 to 250° F., and penetration values varying from 3 to 15 at 77° F., has a barium and zinc soap combination incorporated therein, is suitable as a finisher for such work, and that the physical properties such as melting point and hardness is not substantially changed. Such materials fall well within the range required of coating materials used in the production of fire retarding, rubber insulated cotton covered code wire and in addition, such compounds have fire retarding properties equal to commercial forms of stearine pitch compounds used in the production of flame retarding, moisture resisting code wire.

For example, I have found that when eight per cent of a combination of 50 parts barium laurate and 50 parts zinc laurate are incorporated in an asphalt having a melting point of 238° F., and a penetration of 8 at 77° F., that the resulting melting point is 231° F., and the penetration at 77° F., is 9.

I have further found that when rubber insulated cotton wire is saturated with a 140° F. melting point bituminous composition such as described above, and subsequently finished with a finisher as cited in the above example, that this wire equals in fire resistance performance, and in some instances is superior to wire impregnated with commercial forms of stearine pitch saturants and finishers.

There are many types and sizes of rubber insulated cotton covered wire, and experience has shown that application technique with respect to saturation and finishing must be varied to make all of these various wires behave in a similar manner with respect to fire resistance. This is true both for the stearine pitch type saturants and finishers as well as the soap types.

In brief the proper technique required for each type of wire is one whereby the necessary amount of saturant and finisher can be retained in the cotton covering, so that the ash structure formed on burning is adequate to thwart the propagation of a flame. Controlling factors are the temperature of the saturating and finishing bath, the speed of the wire through these baths, and the size of the finishing dies. In certain instances it may even be necessary to double coat the wire, either by having a finishing tank in tandem with the saturating bath which puts on a light smear coat of finisher, or by running the wire through the finishing bath two times.

For some purposes I have found that combinations of several soaps may be used with advantage, particularly to obtain maximum effectiveness with respect to flame retardance. For example, it has been found that the addition of 3% iron stearate to an asphalt saturant or finisher for the production of code wire and embodying 8% of a barium zinc-soap combination produces a bituminous composition which possesses very efficient flame retarding characteristics. Other soaps may be included as above described, such for example, as minor proportions of aluminum soaps, with barium and zinc soap combinations.

This application is a division of my copending application, Serial No. 408,133, filed August 23, 1941.

Having thus described the invention, what is claimed is:

1. As a new article of manufacture, a flame retarding thermoplastic bituminous composition possessing the property when exposed to direct flame of forming on the surface thereof a carbonaceous ash film of sufficient density and in sufficient amount to form an effective air seal covering the underlying bituminous material to thereby prevent rapid propagation of flame, consisting of a bituminous material selected from the group consisting of those natural asphalts, gilsonite, steam reduced and air blown asphalts from petroleum residua, coal tar pitches, stearine pitches and mixtures thereof which are characterized by their non-greasy and non-oily appearance and feel, and having incorporated therein about eight percent of a mixture of barium and zinc soaps in equal proportion and about three percent of iron stearate based on the weight of the bituminous composition, said flame retarding bituminous composition being further characterized by its ability to maintain substantial predetermined physical characteristics upon cooling after having been subjected to heating to elevated temperatures.

2. As a new article of manufacture, a flame retarding thermoplastic bituminous composition possessing the property when exposed to direct flame of forming on the surface thereof a carbonaceous ash film of sufficient density and in sufficient amount to form an effective air seal covering the underlying bituminous material to thereby prevent rapid propagation of flame, consisting of a bituminous material selected from the group consisting of those natural asphalts, gilsonite, steam reduced and air blown asphalts from petroleum residua, coal tar pitches, stearine pitches and mixtures thereof which are characterized by their non-greasy and non-oily appearance and feel, and having incorporated therein barium and zinc soaps in equal proportion, and iron stearate in a minor amount as compared to the amount of the combination of barium and zinc soaps, said total soap content being in the range of from 3 to 15% of the weight of the bituminous composition, said flame retarding bituminous composition being further characterized by its ability to maintain substantial predetermined physical characteristics upon cooling after having been subjected to heating to elevated temperatures.

PURDUM M. SNYDER.